United States Patent
Ishii et al.

(10) Patent No.: US 8,583,152 B2
(45) Date of Patent: Nov. 12, 2013

(54) BASE STATION APPARATUS, MOBILE STATION, AND COMMUNICATIONS CONTROL METHOD

(75) Inventors: Hiroyuki Ishii, Yokosuka (JP); Yoshihisa Kishiyama, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 534 days.

(21) Appl. No.: 12/740,157

(22) PCT Filed: Oct. 21, 2008

(86) PCT No.: PCT/JP2008/069054
§ 371 (c)(1),
(2), (4) Date: Jun. 4, 2010

(87) PCT Pub. No.: WO2009/057483
PCT Pub. Date: May 7, 2009

(65) Prior Publication Data
US 2010/0255867 A1    Oct. 7, 2010

(30) Foreign Application Priority Data

Oct. 30, 2007   (JP) .................................. 2007-282439

(51) Int. Cl.
*H04B 15/00* (2006.01)
(52) U.S. Cl.
USPC ...................... 455/501; 455/67.11; 455/226.1
(58) Field of Classification Search
USPC ..................................... 455/501, 67.11, 226.1
See application file for complete search history.

(56) References Cited

U.S. PATENT DOCUMENTS

| | | | |
|---|---|---|---|
| 7,990,874 B2 * | 8/2011 | del Rio Herrero et al. ... | 370/236 |
| 8,295,154 B2 * | 10/2012 | Laroia et al. ................... | 370/208 |
| 8,406,279 B2 * | 3/2013 | Hsieh et al. ..................... | 375/149 |
| 8,411,556 B2 * | 4/2013 | Imamura ........................ | 370/208 |
| 2006/0172704 A1 | 8/2006 | Nishio et al. | |
| 2009/0219906 A1 * | 9/2009 | Motegi et al. .................. | 370/342 |
| 2009/0296831 A1 * | 12/2009 | Qi et al. ........................... | 375/259 |
| 2010/0067470 A1 * | 3/2010 | Damnjanovic et al. ........ | 370/329 |
| 2010/0195700 A1 | 8/2010 | Ogawa et al. | |
| 2010/0208603 A1 * | 8/2010 | Ishii ............................... | 370/252 |
| 2010/0246499 A1 * | 9/2010 | Kim et al. ....................... | 370/329 |
| 2011/0255407 A1 * | 10/2011 | Ishii et al. ....................... | 370/235 |

FOREIGN PATENT DOCUMENTS

| | | |
|---|---|---|
| JP | 2000-059286 A | 2/2000 |
| JP | 2000-252879 A | 9/2000 |
| WO | 2005/015797 A1 | 2/2005 |
| WO | 2008/155903 A1 | 12/2008 |

OTHER PUBLICATIONS

International Search Report w/translation from PCT/JP2008/069054 dated Jan. 20, 2009 (5 pages).
Written Opinion from PCT/JP2008/069054 dated Jan. 20, 2009 (4 pages).

(Continued)

*Primary Examiner* — Bobbak Safaipour
(74) *Attorney, Agent, or Firm* — Osha Liang LLP

(57) ABSTRACT

A base station apparatus which communicates in uplink with a mobile station using a random access channel is disclosed. The base station apparatus includes a preamble-sequence securing unit which secures, as preamble sequences not to be used in signal transmission, some preamble sequences of multiple preamble sequences used in the random access channel; and an interference power estimating unit which estimates interference power using the preamble sequences not to be used in the signal transmission.

7 Claims, 15 Drawing Sheets

(56) References Cited

OTHER PUBLICATIONS

Kishiyama, Y. et al.; "Investigations on Random Access Channel Structure in Single-Carrier FDMA Based Evolved UTRA Uplink" (listed on ISR as Single-Carrier FDMA o Mochiiru Evolved UTRA Uplink ni Okeru Random Access Channel Kosei no Kento); IEICE Technical Report, vol. 106, No. 305; pp. 131-136; Oct. 12, 2006 (8 pages).

3GPP TSG RAN WG1 Meeting #51bis, R1-080159; "L1 eNB measurements on PRACH resources"; NTT DoCoMo et al.; Seville, Spain; Jan. 14-18, 2008 (4 pages).

Ogawa, Y. et al.; "Pilot signal generation scheme using frequency dependent cyclic shift sequence for inter-cell interference reduction" (listed on ISR as Cell-kan Kansho o Teigen suru Soshin Taiiki Izongata Junkai Shift Keiretsu o Mochiita Pilot Shingto Seisei Hoho); IEICE Technical Report; vol. 107, No. 518; pp. 341-346; Feb. 27, 2008 (8 pages).

3GPP TSG RAN WG2 #57bis, R2-071541; "Standardised eNB measurements"; NTT DoCoMo et al.; St. Julian's, Malta; Mar. 26-30, 2007 (5 pages).

3GPP TR 25.814 V7.0.0; "Physical layer aspects for evolved Universal Terrestrial Radio Access (UTRA)"; Jun. 2006 (126 pages).

3GPP TS 36.211 V8.0.0; "Evolved Universal Terrestrial Radio Access (E-UTRA), Physical channels and modulation"; Sep. 2007 (49 pages).

Office Action for Japanese Application No. 2009-539019 dated Feb. 5, 2013, with English translation thereof (5 pages).

TSG-RAN WG1 Meeting#45, R1-061114; "Random access design for E-UTRA uplink"; Panasonic; Shanghai, China, May 8-12, 2006 (5 pages).

Espacenet, Patent Abstract for International Publication No. 2008/155903 published Dec. 24, 2008 (1 page).

* cited by examiner

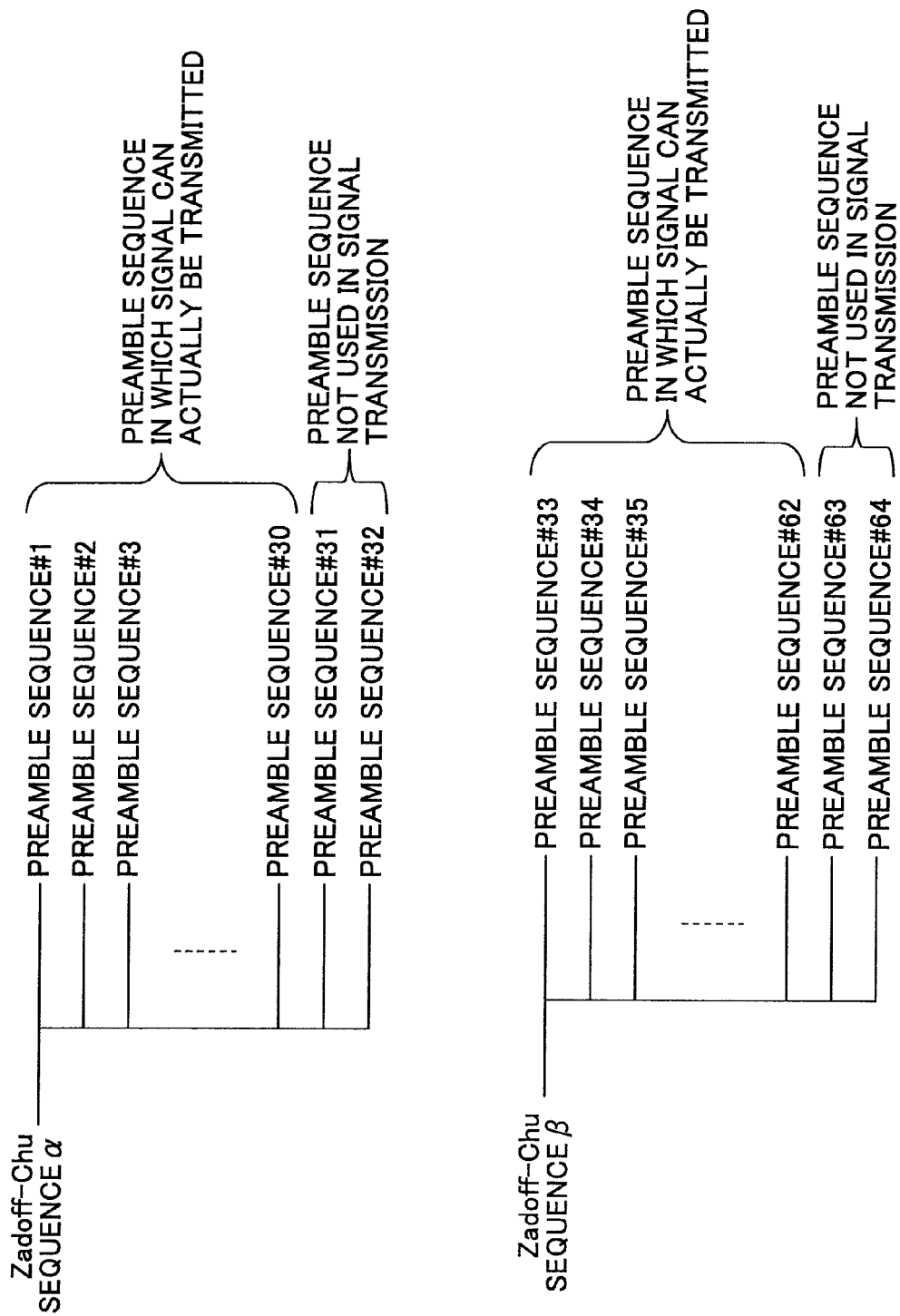

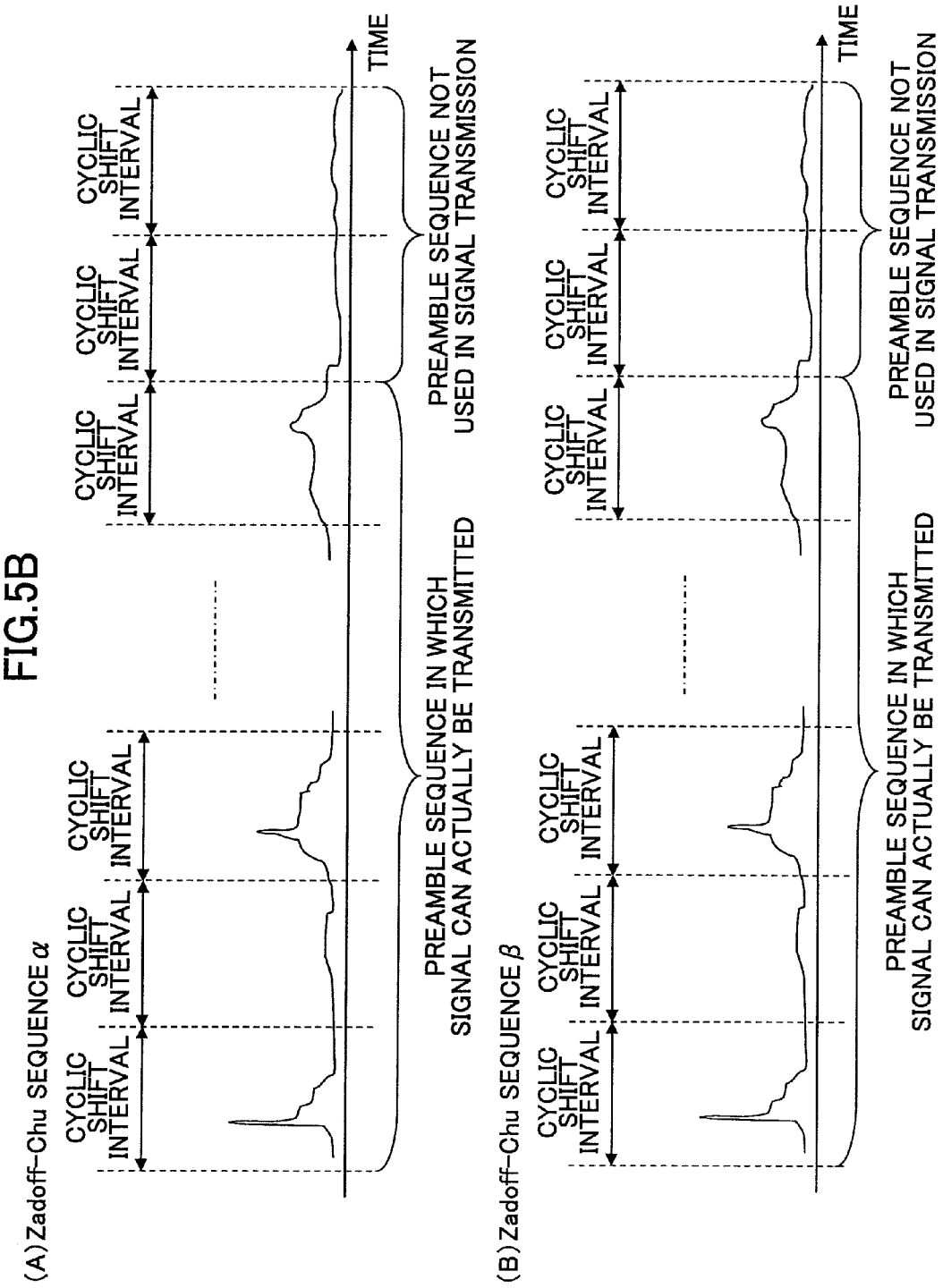

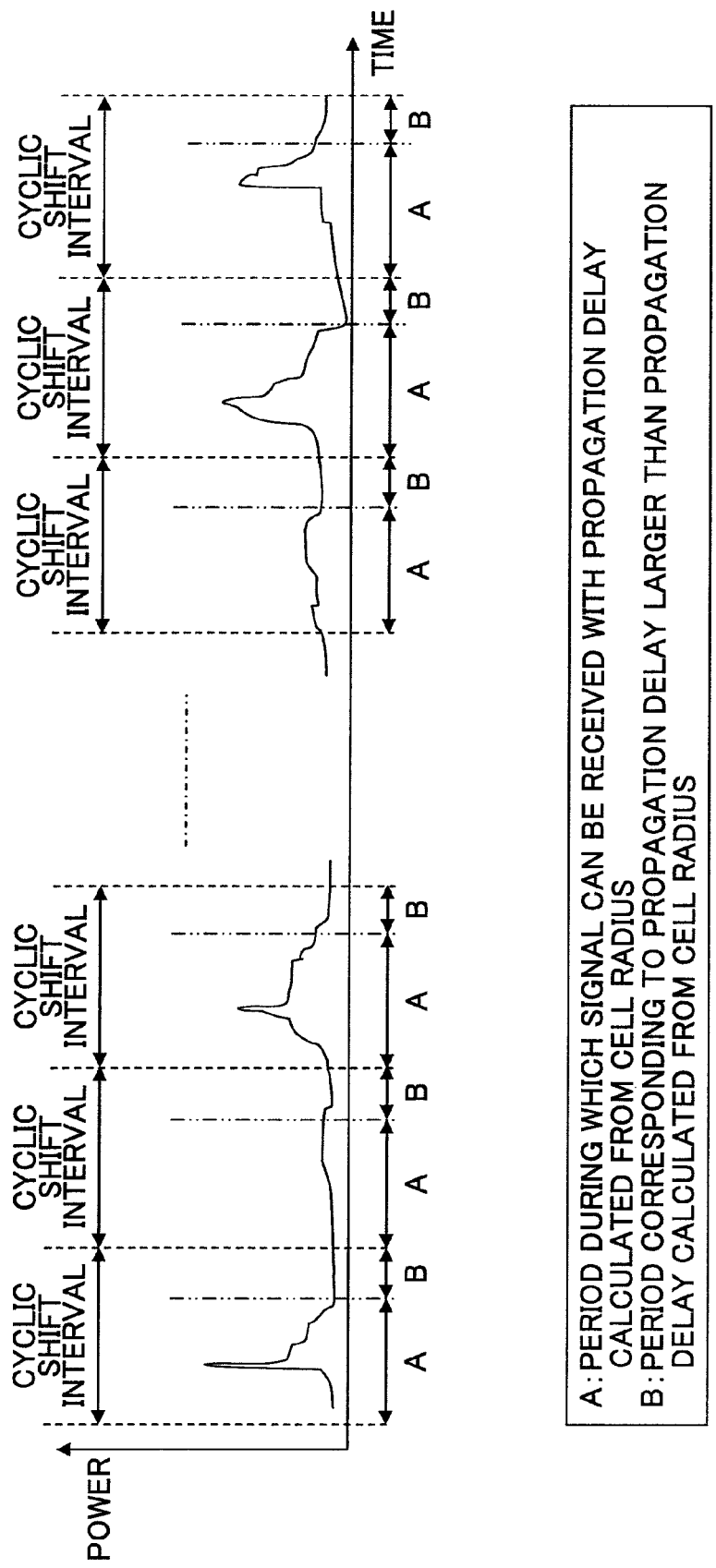

BASE STATION APPARATUS, MOBILE STATION, AND COMMUNICATIONS CONTROL METHOD

BACKGROUND OF THE INVENTION

1. Field of the Invention

The present invention relates to base station apparatuses, mobile stations, and communications control methods.

2. Description of the Related Art

Communications schemes to succeed W-CDMA and HSDPA (i.e., long term evolution (LTE)) are being studied in a W-CDMA standardization body called 3GPP. Of these communications schemes, OFDMA (orthogonal frequency division multiplexing access) is being considered for downlink, while SC-FDMA (single-carrier frequency division multiple access) is being considered for uplink as radio access schemes. (See 3GPP TR25.814 (V7.0.0), "Physical Layer Aspects for Evolved UTRA," June 2006, for example.)

The OFDMA, which is a scheme for dividing a frequency band into multiple narrow frequency bands (sub-carriers) and overlaying data onto the respective frequency bands to transmit the data, densely arranges the sub-carriers on the frequency axis such that one sub-carrier partially overlaps another sub-carrier without their interfering with each other, making it possible to achieve high-speed transmission and to improve frequency utilization efficiency.

The SC-FDMA is a transmission scheme which divides a frequency bandwidth and transmits using different frequency bands among multiple terminals to make it possible to reduce interference between the terminals. The SC-FDMA, which features a reduced variation in transmission power, makes it possible to achieve wide coverage as well as low power consumption of the terminals.

In general, in a mobile communications system, a random access channel is used in order to establish an initial connection in uplink. In other words, a mobile station transmits a random access channel to a base station apparatus when it starts conducting communications. The random access channel, which is also called a contention based channel, is a channel for requesting a resource allocation, etc. The random access channel is also used for purposes of initial connection establishment, handover, and uplink scheduling request, uplink synchronization establishment request, etc.

A preamble first transmitted from a mobile station in a random access procedure is, because of its nature, transmitted at an arbitrary timing by the mobile station, so that a base station apparatus is not able to know what timing the preamble is transmitted at. In this case, the base station apparatus estimates received power and interference power for all preamble sequences which may be transmitted, and detects the respective preamble sequences based on the received power and the interference power.

For example, as the W-CDMA uplink is a non-orthogonal system, the base station is able to estimate the interference power by calculating received levels of the whole bandwidth. A correlation is taken between all preamble sequences which may be transmitted and a replica sequence to calculate the received power.

On the other hand, a preamble sequence in the LTE sequence is generated using a Zadoff-Chu sequence, which is one of CAZAC (constant amplitude zero auto-correlation) sequences with a zero correlation zone, as defined in 3GPP TS 36.211 (V8.0.0), "Evolved Universal Terrestrial Radio Access (E-UTRA), Physical channels and modulation," June 2006. For the Zadoff-Chu sequence, one sequence is used, or two or more sequences are used. In this case, preamble sequences generated from the same Zadoff-Chu sequence are orthogonal with one another, so that it is not possible to estimate interference power as in the W-CDMA system. For example, when all preamble sequences are generated from the same Zadoff-Chu sequence, even when a received level is high, signal powers of other preamble sequences are orthogonalized to become zero, so that an actual interference level may be small.

SUMMARY OF THE INVENTION

Problem(s) to be Solved by the Invention

As described above, in the LTE system, there arises a problem that, as preamble sequences generated from the same Zadoff-Chu sequence are mutually orthogonal, interference power cannot be estimated just by calculating received power.

Means for Solving the Problem

In order to solve the above-described problem, a base station apparatus is provided. The base station apparatus is a base station apparatus which communicates in uplink with a mobile station using a random access channel, including:

a preamble-sequence securing unit which secures, as preamble sequences not to be used in signal transmission, some preamble sequences of multiple preamble sequences used in the random access channel; and an interference power estimating unit which estimates interference power using the preamble sequences not to be used in the signal transmission.

Moreover, a base station apparatus according to the present invention is a base station apparatus which communicates in uplink with a mobile station using a random access channel, including:

a preamble sequence setting unit which sets preamble sequences, assuming a propagation delay which is greater than a propagation delay calculated from a cell radius; and an interference power estimating unit which estimates interference power using a period corresponding to the propagation delay which is greater than the propagation delay calculated from the cell radius.

Furthermore, a method of controlling communications according to the present invention is a method of controlling communications in a base station apparatus, the communications being in uplink with a mobile station using a random access channel, the method including:

a first step of securing, as preamble sequences not to be used in signal transmission, some preamble sequences out of multiple preamble sequences used in the random access channel;

a second step of estimating interference power using preamble sequences not to be used in the signal transmission;

a third step which estimates received power of the preamble sequences in the random access channel; and a fourth step which detects the preamble sequences based on the interference power and the received power.

Moreover, a mobile station according to the present invention is a mobile station which communicates in uplink with a base station apparatus using a random access channel, including:

a receive unit which receives, in broadcast information or an RRC message as preamble sequences for use in the random access channel, information on preamble sequences other than preamble sequences not to be used in signal transmission; and a transmit unit which transmits a signal in the random access channel using the preamble sequences other than preamble sequences not to be used in the signal transmission.

Advantage of the Invention

The embodiments of the present invention makes it possible to achieve, in uplink of a radio communications system, a base station apparatus, a mobile station, and a communications control method that make it possible to accurately measure an amount of interference of a random access channel having preamble sequences which are mutually orthogonal.

BRIEF DESCRIPTION OF THE DRAWINGS

FIG. 5A is a diagram illustrating an example of the preamble sequence used in the random access channel;

FIG. 5B is a diagram for explaining a method (part 1) of estimating interference power of the random access channel (when there are two Zadoff-Chu sequences);

FIG. 7A is a diagram for explaining the method (part 2) of estimating interference power of the random access channel;

DESCRIPTION OF THE PREFERRED EMBODIMENTS

Figure 1:
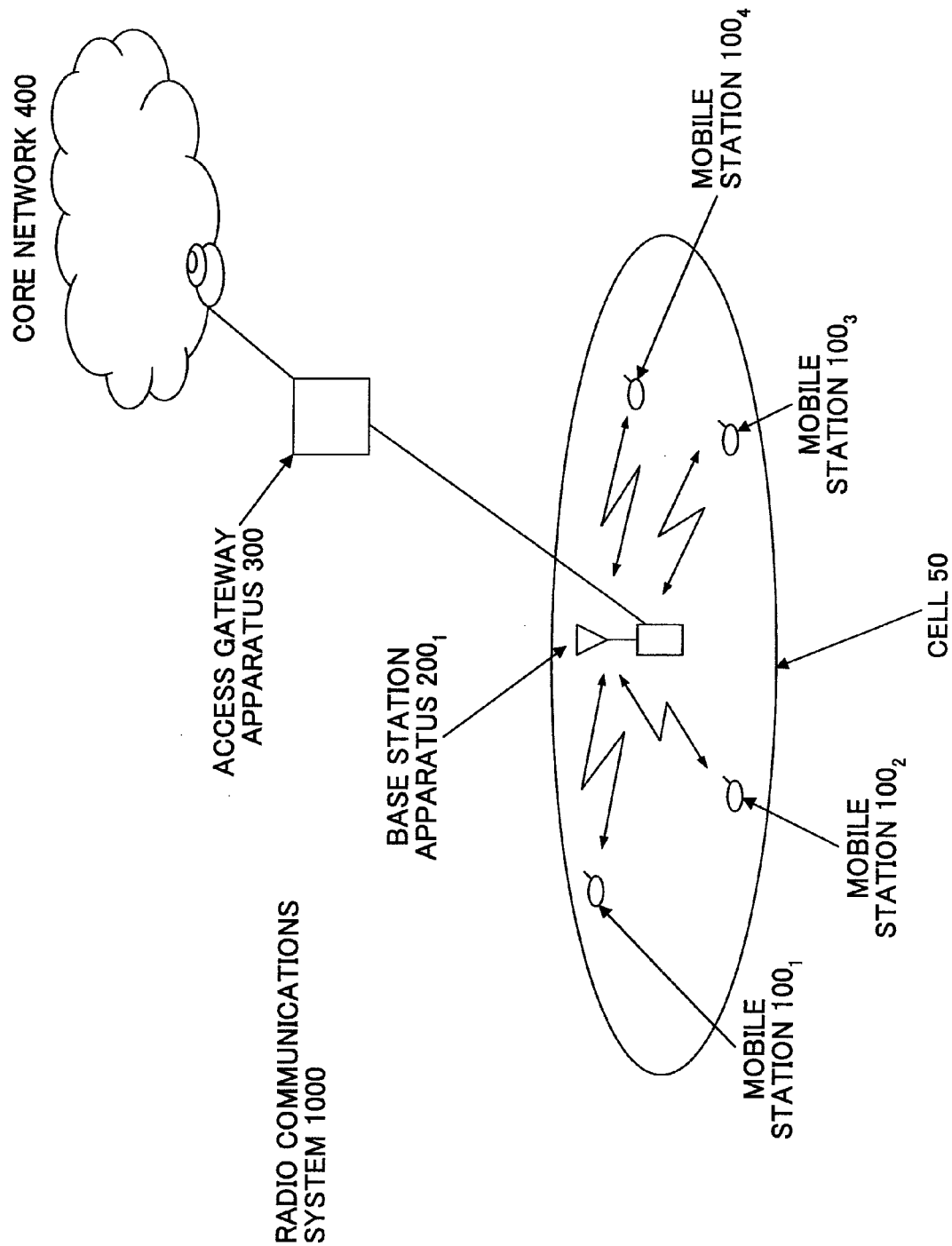
FIG. 1 is a block diagram illustrating a configuration of a radio communications system according to an embodiment of the present invention.

[Description of Notations]
50 cell
$100_1$, $100_2$, $100_3$, $100_n$ mobile station
102 transmit/receive antenna
104 amplifier
106 transmitter/receiver
108 base band signal processor
110 call processor
112 application unit
200 base station apparatus
202 transmit/receive antenna
204 amplifier
206 transmitter/receiver
208 base band signal processor
210 call processor
212 transmission line interface
2081 layer 1 processor
2082 MAC processor
2083 RLC processor
20812 RACH receiver
208120 DFT unit
208121 correlator
208122 IDFT unit
208123 profile calculating unit
208124 signal power estimator
208125 interference power estimator
208126 detector
208127 preamble sequence controller
300 access gateway apparatus
400 core network
1000 radio communications system

BEST MODE OF CARRYING OUT THE INVENTION

In the following, best modes for carrying out the invention are described based on the following embodiments with reference to the drawings. Throughout the drawings for explaining the embodiments, same letters are used for those elements having the same functions, so that repetitive explanations are omitted.

With reference to FIG. 1, an explanation is given for a radio communications system to which a base station apparatus according to an embodiment of the present invention is applied.

A radio communications system 1000, which is a system to which LTE (also called Evolved UTRA and UTRAN, or Super 3G) is applied, for example, includes a base station apparatus (eNB: eNode B) 200 and multiple mobile stations (user equipment UE units) $100_n$ ($100_1$, $100_2$, $100_3$, ..., $100_n$, where n is an integer such that n>0). The base station apparatus 200 is connected to an upper-layer station (e.g., an access gateway apparatus 300). The access gateway apparatus 300 is connected to a core network 400. The access gateway apparatus 300 may be called an MME/SGW (mobility management entity/serving gateway). Moreover, the mobile station UE may be called a user equipment.

Here, mobile stations $100_n$ include both a mobile station in communication using the LTE with the base station apparatus 200 in a cell 50, and a mobile station not in communication using the LTE with the base station apparatus 200 in the cell 50. For example, the mobile station not in communication using the LTE with the base station apparatus 200 in the cell 50 transmits a random access channel to the base station apparatus 200 to conduct a procedure for starting communications. Moreover, the mobile station which is in communication using the LTE with the base station apparatus 200 in the cell 50 may also send a random access channel for the purposes of handover and uplink scheduling request, uplink synchronization establishment request, etc.

Below, the mobile stations $100_n$ ($100_1$, $100_2$, $100_3$, ..., $100_n$) have the same configuration, function, and status. Thus, unless otherwise indicated, they will be explained below as the mobile station 100n.

For the radio communications system 1000, OFDMA (Orthogonal Frequency Division Multiple Access) is applied for downlink and SC-FDMA (Single Carrier-Frequency Division Multiple Access) is applied for uplink as radio access schemes. As described above, the OFDMA is a scheme for dividing a frequency band into multiple narrow frequency bands (sub-carriers) and overlaying data onto the respective frequency bands to transmit the data. The SC-FDMA is a transmission scheme which divides a frequency bandwidth and transmits using different frequency bands among multiple terminals to make it possible to reduce interference between the terminals.

Here, communications channels in the LTE are described.

In the LTE, in both downlink and uplink, data are transmitted and received in units of resource blocks in the frequency direction and in units of sub-frames in the time direction. In the LTE, a frequency bandwidth of one resource block is 180 kHz.

In downlink, a PDSCH (physical downlink shared channel), which is shared for use by the mobile stations $100_n$, and a downlink control channel for the LTE are used. In other words, the physical downlink shared channel as well as the downlink control channel for the LTE are referred to as the downlink channel. In downlink, the downlink control channel for the LTE is used to report information on a user which conducts communications using the physical downlink shared channel and information on its transport format, information on a user which conducts communications using a physical uplink shared channel and information on its transport format, and acknowledgement information on a physical uplink shared channel; and the physical downlink shared channel is used to transmit packet data.

For uplink, a PUSCH (Physical Uplink Shared Channel) which is shared for use by the mobile stations $100n$ and an uplink control channel for the LTE are used. There are two types of uplink control channels: a channel which is time multiplexed with the physical uplink shared channel and a channel which is frequency multiplexed with the same.

In uplink, downlink CQI (Channel Quality Indicator) information for use in physical downlink shared channel scheduling and AMC (Adaptive Modulation and Coding), and physical downlink shared channel HARQ ACK information are transmitted using the uplink control channel for the LTE. Moreover, packet data are transmitted using the physical uplink shared channel.

Furthermore, in uplink a random access channel is used for random access. Below, a random access channel in the LTE system is described.

Figure 2:
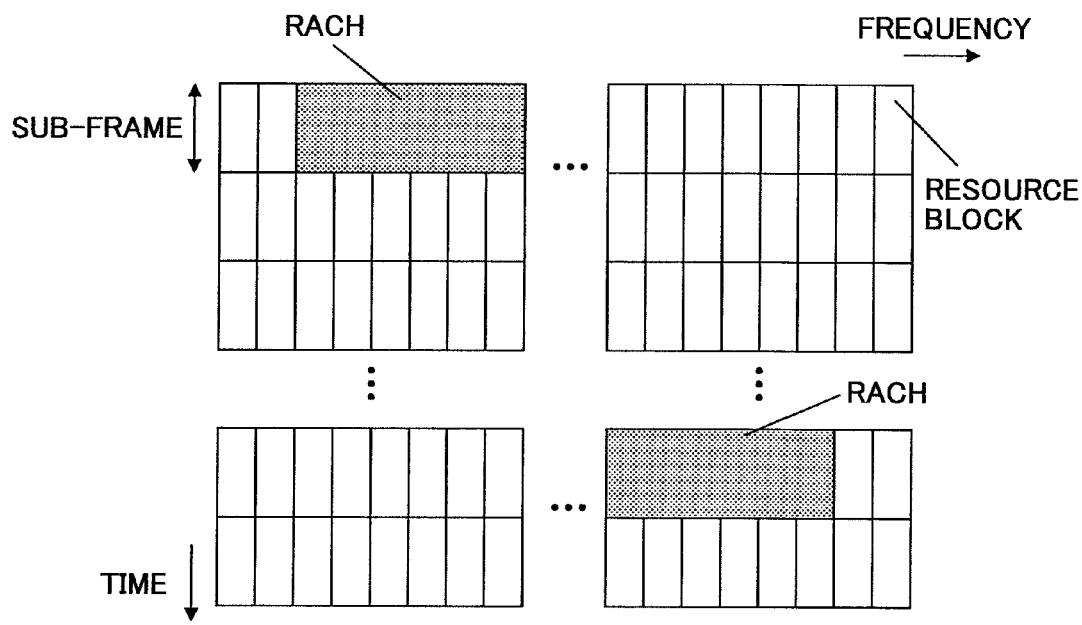
FIG. 2 is a diagram illustrating an exemplary physical resource for a random access channel.
Figure 3:
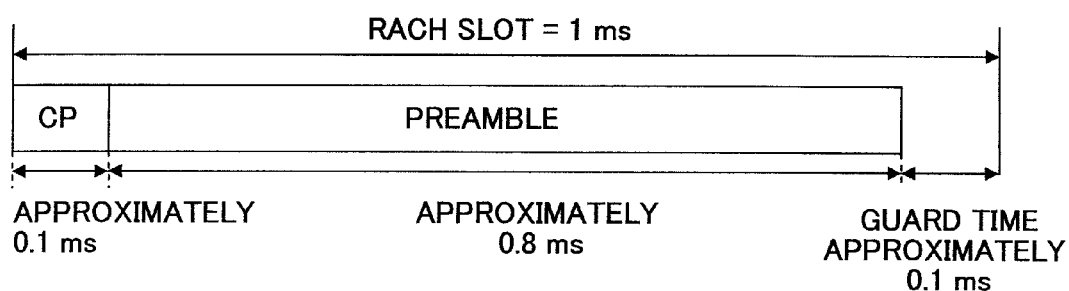
FIG. 3 is a diagram illustrating a frame format of the random access channel.

The random access channel in the LTE system is transmitted in a frequency bandwidth and a time interval that are reported from the base station in advance in a broadcast channel. More specifically, 64 preamble sequences are defined per cell and the 64 preamble sequences are transmitted in the random access channel. In FIG. 2, an exemplary physical resource of a random access channel (RACH) is illustrated. In the LTE, six resource blocks are allocated as the frequency bandwidth. Moreover, taken into account various cell radiuses, preamble formats ranging from approximately 0.9 ms to approximately 2.3 ms are defined in the time direction. FIG. 3 shows a case of approximately 0.9 ms. In FIG. 3, of the 1 ms sub-frame, approximately 0.1 ms is used for a CP (cyclic prefix), approximately 0.8 ms is used for a preamble, and the remaining approximately 0.1 ms becomes a guard period. As a physical channel, the random access channel is called a physical random access channel.

Moreover, in a random access channel in the LTE, there are a dedicated preamble, which is allocated on a dedicated basis, and a randomly-transmitted preamble. The dedicated preamble, which is allocated on the dedicated basis is used for a non-contention random access procedure, while the randomly-transmitted preamble is used for a contention random access procedure. The dedicated preamble is used when a mobile station conducts a handover, for example. In other words, when the mobile station accesses a base station apparatus to handover to, it is used by the mobile station which conducts the handover. The dedicated preamble is reported to the mobile station from a base station apparatus from which the handover is conducted. In this case, other mobile stations do not use the dedicated preamble, so that a collision (contention) of a random access channel does not occur, and, thus as a result, stable communications are made possible. On the other hand, a preamble transmitted randomly is, in a manner similar to a normal random access, randomly selected from multiple preambles. In this case, the other mobile stations can select the same preamble, leading to a contention random access.

The dedicated preamble is distinguished from the randomly-transmitted preamble using a preamble ID. For example, when there are 64 preamble sequences and preamble IDs of 0 to 63, 0-15 may be set as dedicated preambles and 16-63 may set as randomly-transmitted preambles. Below the range of IDs (e.g., 0-15) for dedicated preambles is called a dedicated preamble region, while the range of IDs (e.g., 16-63) for randomly-transmitted preambles is called a randomly-transmitted preamble region.

For example, when a certain mobile station conducts a handover, a base station apparatus from which the handover is conducted select one preamble of dedicated preambles with IDs of 0-15, and reports the ID of the preamble to the mobile station. Then, using a preamble specified, the mobile station makes a non-contention random access to a base station apparatus to handover to.

On the other hand, when a certain mobile station makes an initial access, for example, the mobile station randomly selects one preamble out of randomly-transmitted preambles, and uses the selected preamble to make a contention random access.

Moreover, the randomly-transmitted preambles may be divided into high priority preambles and low priority preambles. For example, when there are 64 preamble sequences and preamble IDs of 0 to 63, 0-15 may be set as dedicated preambles, 16-31 may be set as randomly-transmitted high-priority preambles, and 32-63 may be set as randomly-transmitted low-priority preambles. Below, a range of IDs (e.g., 16-31) of randomly-transmitted high-priority preambles is called a randomly-transmitted high-priority preamble region, while a range of IDs (e.g., 32-63) of randomly-transmitted low-priority preambles is called a randomly-transmitted low-priority preamble region.

This makes it possible to perform control such that a high-priority mobile station, or a mobile station which conducts a random access high-priority procedure transmits a high-priority preamble, and a low-priority mobile station, or a mobile station which conducts a random access low-priority procedure transmits a low-priority preamble. In other words, a high-priority mobile station, or a mobile station which conducts a high-priority random access procedure randomly selects a preamble out of preambles 16-31 to transmit the selected preamble, while a low-priority mobile station, or a mobile station which conducts a low-priority random access procedure randomly selects a preamble out of preambles 32-63 to transmit the selected preamble. Here, the random access procedure refers to a procedure using a random access channel, such as initial access, handover, uplink scheduling request, an uplink synchronization establishment, an uplink synchronization establishment request, a downlink communications restart, etc.

In this way, a random access preamble region can be divided into a high-priority preamble region and a low-priority preamble region to perform random access priority control.

While types of priority include two types; "high" and "low" in the above-described example, there may be three or more types.

Allocation of preamble IDs to the above-described dedicated preambles, randomly-transmitted preambles, randomly-transmitted high-priority preambles, and randomly-transmitted low-priority preambles are determined by the base station apparatus, and reported to the mobile station using broadcast information and an RRC message.

Below, a preamble signal is described (3GPP TS 36.211 (V8.0.0), "Evolved Universal Terrestrial Radio Access (E-UTRA), Physical channels and modulation," June 2006):

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\phi+K(k_0+1/2))\Delta f_{RA}(t-T_{CP})}$$ Equation 1

$$K = \Delta f / \Delta f_{RA}$$

$$k_0 = k_{RA} N_{sc}^{RB} - N_{RB}^{UL} N_{sc}^{RB} / 2$$

$$x_{u,v}(n) = x_u((n + vN_{CS}) \bmod N_{ZC})$$

$$x_u(n) = e^{-j\frac{\pi un(n+1)}{N_{ZC}}}, 0 \le n \le N_{ZC} - 1$$

Here, $\beta_{PRACH}$ is an amplitude scaling factor, $N_{ZC}$ is a sequence length of a Zadoff-Chu sequence, parameter $\phi$ is a fixed offset in the frequency direction, $T_{cp}$ is a CP length, $\Delta f_{RA}$ is a preamble sub-carrier interval, $\Delta f$ is a normal uplink signal sub-carrier interval, $k_{RA}$, is a parameter for determining a random access channel resource block location, $N_{SC}^{RB}$ is the number of sub-carriers per 1 RB, $N_{RB}^{UL}$ is the number of resource blocks, $v$ is an index on a cyclic shift of each preamble sequence, and $N_{CS}$ is a cyclic shift amount.

Method of Estimating Interference Power of Random Access Channel (Part 1)

Figure 4A:
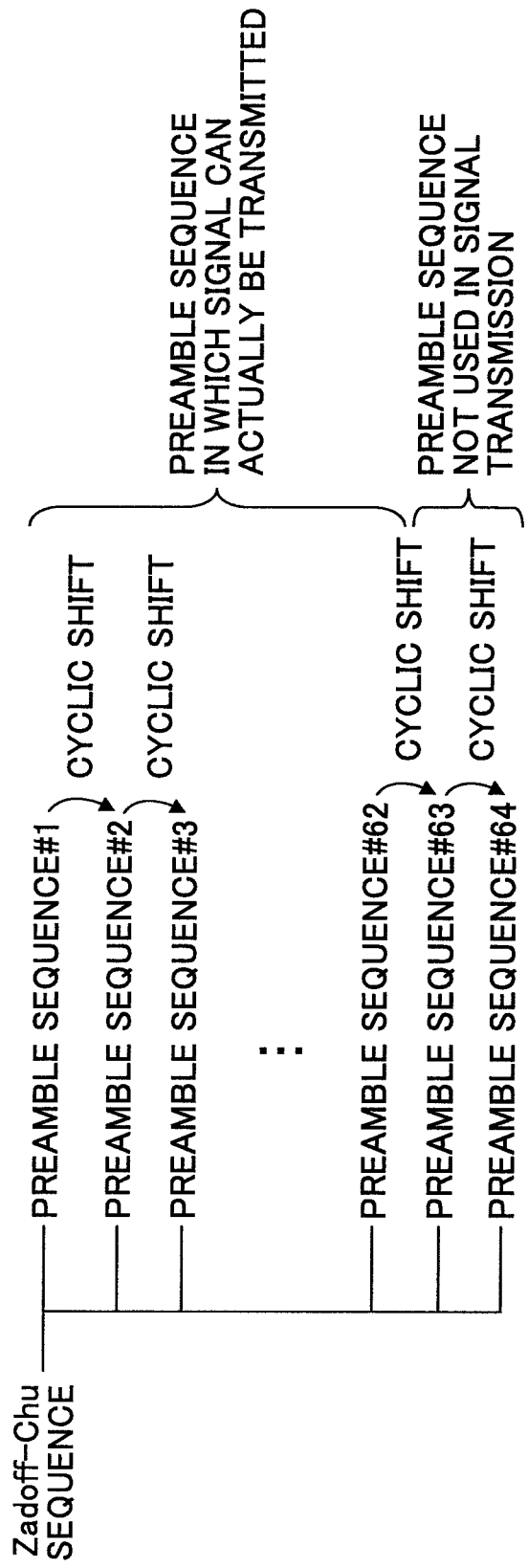
FIG. 4A is a diagram illustrating an example of a preamble sequence used in the random access channel.

As described above, in the random access channel in the LTE system, 64 preamble sequences defined per cell are used. The 64 preamble sequences are generated using one Zadoff-Chu sequence or using two or more Zadoff-Chu sequences. FIG. 4A illustrates an example in which 64 preamble sequences are generated from one Zadoff-Chu sequence. When 64 preamble sequences are generated from two Zadoff-Chu sequences, the respective Zadoff-Chu sequences are cyclically shifted 32 times to generate the 64 preamble sequences. The preamble sequences generated by cyclically shifting the same Zadoff-Chu sequence have a characteristic that they are mutually orthogonal.

In order to estimate interference power, taking into account the mutually orthogonal preamble sequence, the base station apparatus secures some preamble sequences out of 64 preamble sequences as preamble sequences not to be used in signal transmission. For example, 62 preamble sequences out of 64 preamble sequences are used in signal transmission and 2 preamble sequences are secured as preamble sequences not to be used in signal transmission. The base station apparatus may estimate interference power using preamble sequences not to be used in signal transmission. In the above-described example, two preamble sequences are secured as preamble sequences not to be used in signal transmission, but the number of preamble sequences to be secured does not have to be limited to 2, so that a value other than 2 may be set.

Figure 4B:
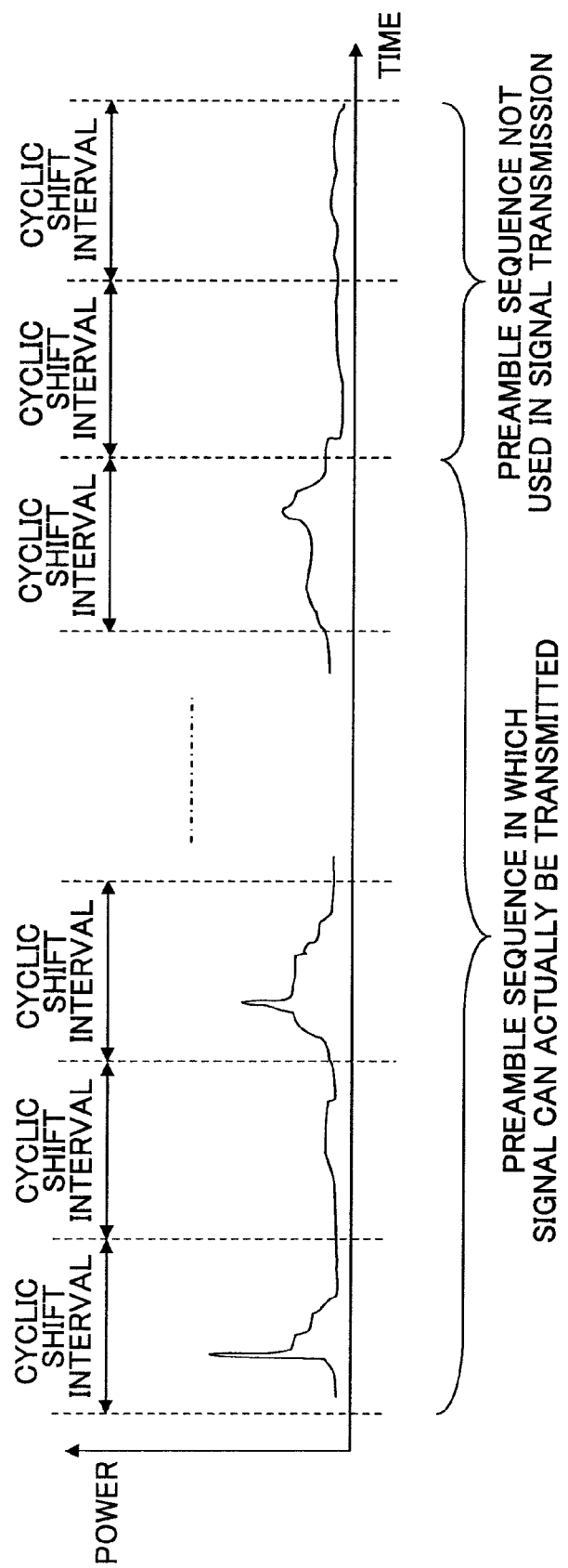
FIG. 4B is a diagram for explaining a method (part 1) of estimating interference power of the random access channel.

An exemplary delay profile when preamble sequences are secured as preamble sequences not to be used in signal transmission is shown in FIG. 4B. The delay profile is calculated by frequency-converting a received signal, detecting a correlation with a Zadoff-Chu sequence, and converting the correlation value (channel estimation value) to time domain. The base station apparatus may estimate interference power using a preamble sequence not used in signal transmission. Moreover, received power of a preamble sequence which may actually be transmitted is estimated from a received level in a region of each preamble sequence defined using a cyclic shift interval.

When two Zadoff-Chu sequences are used, the cyclic shift interval doubles in comparison to when one Zadoff-Chu sequence is used. In this case also, when taking a correlation with two Zadoff-Chu sequences, the base station apparatus can estimate interference power using a preamble sequence not to be used in signal transmission.

FIG. 5A shows a case in which two Zadoff-Chu sequences (i.e., a Zadoff-Chu sequence a and a Zadoff-Chu sequence β) are defined. As illustrated on FIG. 5A, in each Zadoff-Chu sequence, some preamble sequences are secured as preamble sequences such that they are not to be used. For example, in each Zadoff-Chu sequence, 30 preambles out of 32 preamble sequences are used in signal transmission and 2 preamble sequences not to be used in signal transmission. Then, the base station apparatus may estimate interference power using a preamble sequence not used in signal transmission.

FIG. 5B illustrates an exemplary delay profile when, in respective Zadoff-Chu sequences with the number of Zadoff-Chu sequences being 2, preamble sequences are secured as preamble sequences not to be used in signal transmission. In this case, for interference power of the Zadoff-Chu sequence α, preamble sequences in Zadoff-Chu sequence a that are not to be used in signal transmission are used to estimate interference power, and for interference power of the Zadoff-Chu sequence β, preamble sequences in Zadoff-Chu sequence β that are not used in signal transmission are used to estimate interference power. Alternatively, as interference power of the Zadoff-sequences α and β, an average value of interference power calculated using preamble sequences in the Zadoff-sequence a that are not used in signal transmission and preambles sequences in the Zadoff-sequence β that are not used in signal transmission may be used.

Alternatively, only for the Zadoff-Chu sequence α, some preamble sequences may be secured such that they are not to be used in signal transmission, and the preamble sequences not to be used in signal transmission may be used to estimate interference power in the Zadoff-Chu sequences α and β.

In the above-described example, a case such that the number of Zadoff-Chu sequences is 2 is shown, but it is possible to apply the same interference power estimating method when the number of Zadoff-Chu sequences is no less than 3.

Method of Estimating Interference Power of Random Access Channel (Part 2)

In order to estimate interference power, taking into account mutually orthogonal preamble sequences, the base station apparatus may set preamble sequences, assuming a propagation delay which is greater than a propagation delay calculated from a cell radius.

Figure 6:
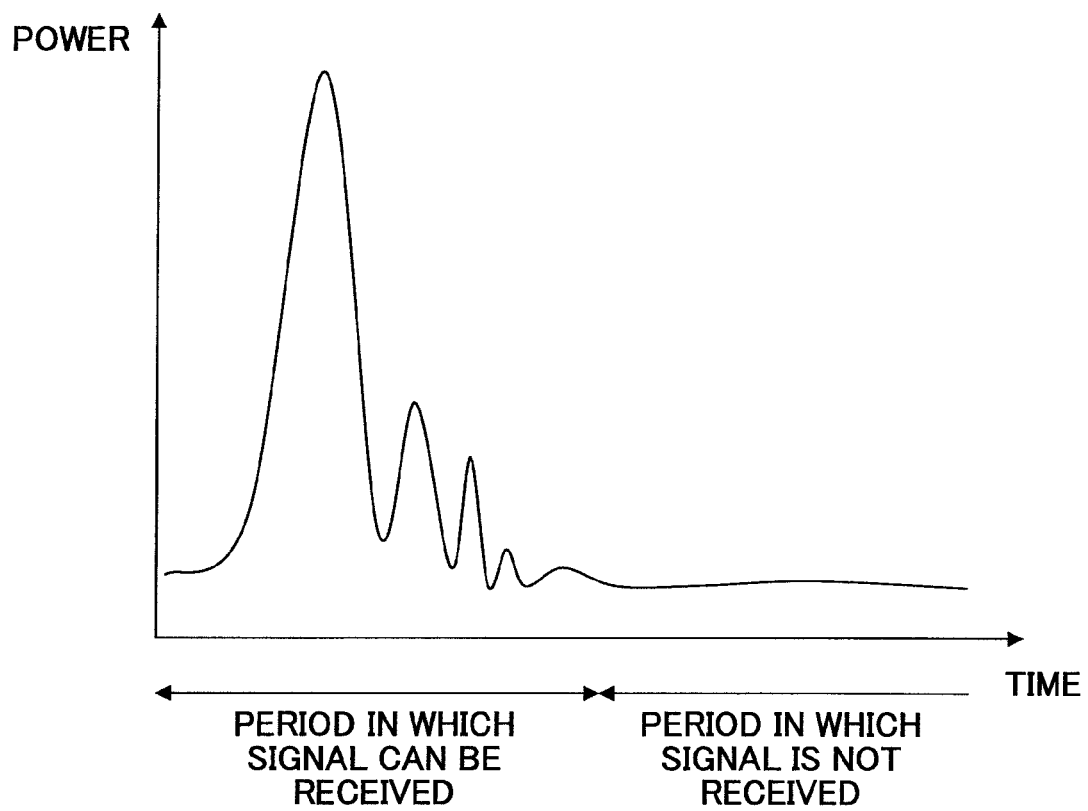
FIG. 6 is a diagram illustrating a delay profile calculated at a base station apparatus.

As shown in FIG. 6, a period (a propagation delay) in which the base station apparatus may receive a signal may be calculated from the cell radius. When the cyclic shift interval is larger than the propagation delay calculated from the cell radius, a period in which a signal is not actually received exists within the cyclic shift interval. The base station apparatus may estimate interference power using a period corresponding to a propagation delay which is greater than the propagation delay calculated from the cell radius. The preamble sequences are set such that interference power can be estimated as described above. There exists a relationship such that the cyclic shift interval becomes large when the number of Zadoff-Chu sequences used for generating preamble sequences is increased. Using such a relationship, the number of Zadoff-Chu sequences is set such that a period exists which corresponds to a propagation delay which is greater than the propagation delay calculated from the cell radius.

FIG. 7A illustrates an exemplary delay profile when preamble sequences are set, assuming a propagation delay which is greater than a propagation delay calculated from the cell radius. The base station apparatus may estimate interference power using a period (B) corresponding to a propagation delay which is greater than the propagation delay calculated from the cell radius. Moreover, this interference power may be used to estimate received power of the preamble sequences from a period (A) in which a signal may be received with a propagation delay calculated from the cell radius.

Figure 7B:
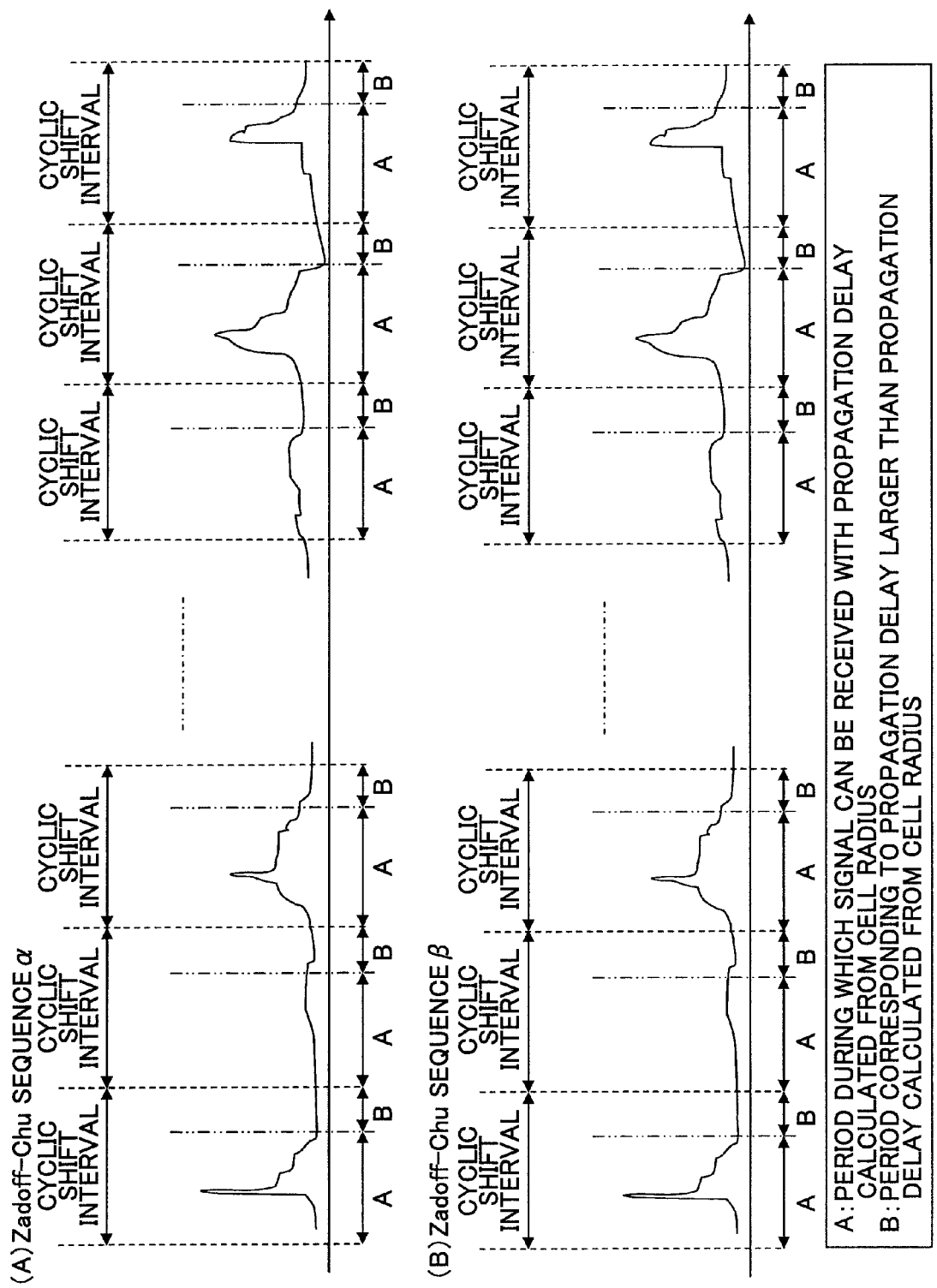
FIG. 7B is a diagram for explaining the method (part 2) of estimating interference power of the random access channel (when there are two Zadoff-Chu sequences)

FIG. 7B illustrates an exemplary delay profile when preamble sequences are secured in each Zadoff-Chu sequence (with the number of Zadoff-Chu sequences being 2) as preamble sequences not to be used in signal transmission. In this case, the base station apparatus, for interference power of the Zadoff-Chu sequence α, estimates interference power using a period (B) corresponding to a propagation delay which is greater than a propagation delay calculated from the cell radius in the Zadoff-Chu sequence α, and, for interference power of the Zadoff-Chu sequence β, estimates interference power using a period (B) corresponding to a propagation delay which is greater than a propagation delay calculated from the cell radius in the Zadoff-Chu sequence β. Alternatively, the base station apparatus may, as interference power of Zadoff-Chu sequences β and β, use an average value of a period (B) corresponding to a propagation delay which is greater than a propagation delay calculated from a cell radius in the Zadoff-Chu sequence α and a period (B) corresponding to a propagation delay which is greater than a propagation delay calculated from a cell radius in the Zadoff-Chu sequence β.

In the above-described example, a case such that the number of Zadoff-Chu sequences is 2 has been shown, but the same interference power estimating method may be applied when the number of Zadoff-Chu sequences is no less than 3.

Configuration of Base Station Apparatus

Figure 8:
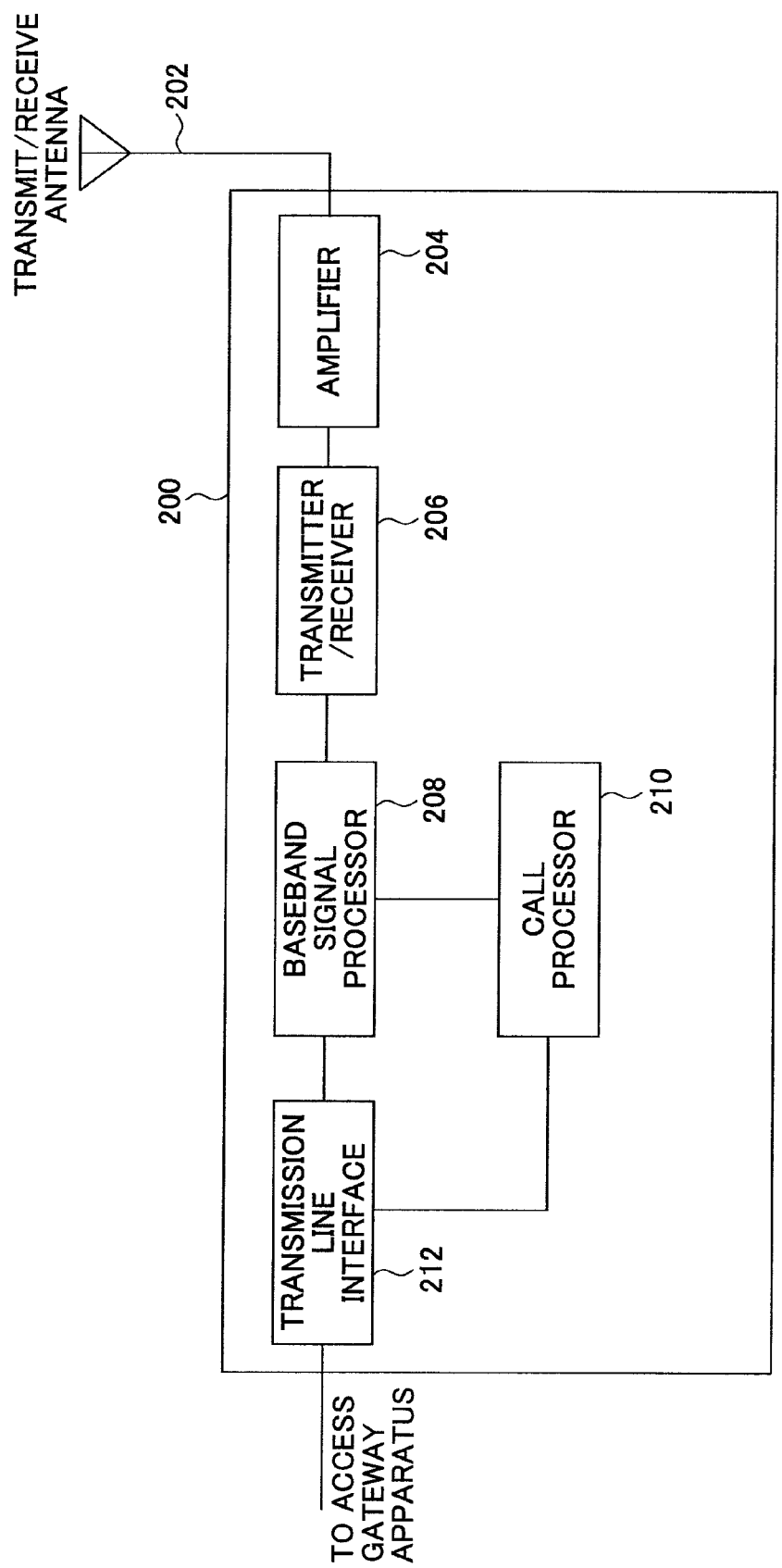
FIG. 8 is a partial block diagram illustrating the base station apparatus according to one embodiment of the present invention.

Next, the base station apparatus 200 according to the embodiment of the present invention is described with reference to FIG. 8.

The base station apparatus 200 according to the embodiment of the present invention includes a transmit/receive antenna 202, an amplifier 204, a transmitter/receiver 206, a base band signal processor 208, a call processor 210, and a transmission line interface 212.

Packet data transmitted from the base station apparatus 200 to the mobile station $100_n$ in downlink is input from an upper-layer station which is located at a layer upper to the base station apparatus 200 (for example, access gateway apparatus 300) via a transmission line interface 212 to a base band signal processor 208.

The base band signal processor 208 performs RLC (radio link control) layer transmission processes such as RLC (radio link control) retransmission control transmission process, segmentation/concatenation of packet data, PDCP layer transmission process, MAC (medium access control) retransmission control, for example, HARQ (Hybrid automatic repeat request) transmission process, scheduling, transmission format selection, channel encoding, and inverse fast Fourier transform (IFFT) process before it is transferred to the transmitter/receiver 206.

The transmitter/receiver 206 performs a frequency conversion process in which a base band signal output from the base band signal processor 208 is converted to a radio frequency band. Then, the signal is amplified at the amplifier 204, which amplified signal is transmitted from the transmit/receive antenna 202.

On the other hand, for data transmitted from the mobile station apparatus $100_n$ to the base station apparatus 200 in uplink, a radio frequency signal received at the transmit/receive antenna 202 is amplified at the amplifier 204, which amplified signal is frequency converted at the transmitter/receiver 206 to the base band signal, which is input to the base band signal processor 208.

The base band signal processor 208 performs FFT process, IDFT process, error correction decoding, MAC retransmission control receive process, RLC layer receive process, PDCP layer receive process, etc., on the input base band signal, which processed signal is transferred to the access gateway apparatus 300 via the transmission line interface 212.

Moreover, as described below, the base band signal processor 208 performs random channel receive process.

The call processor 210 performs call processes such as communications channel setting and releasing, status control of the base station 200, and radio resource control.

Figure 9:
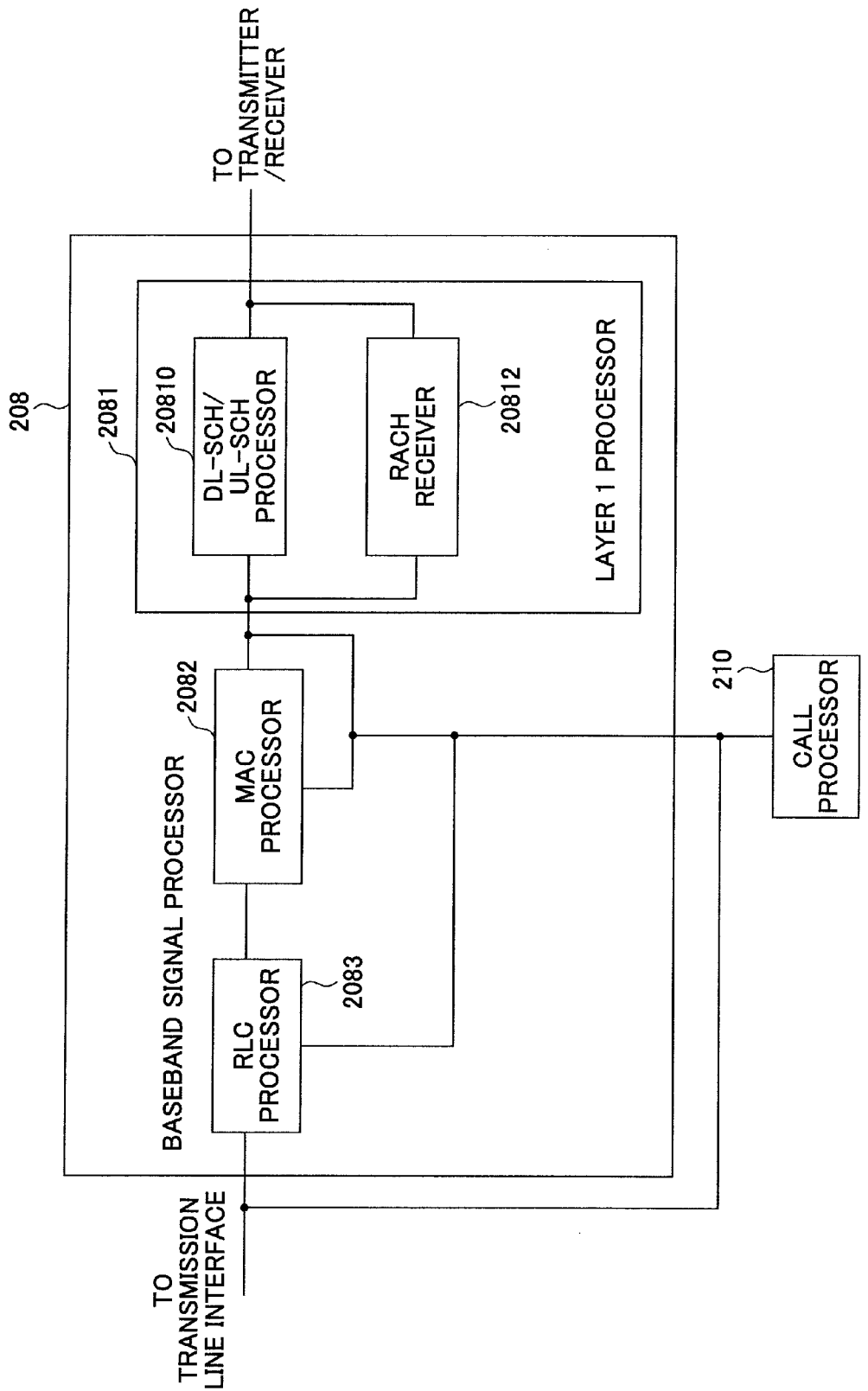
FIG. 9 is a partial block diagram illustrating a base band signal processor of the base station apparatus according to one embodiment of the present invention.

Next, a base band signal processor 208 is described with reference to FIG. 9.

The base band signal processor 208 includes a layer 1 processor 2081, a MAC processor 2082, and an RLC processor 2083. The layer 1 processor 2081 includes a DL-SCH/UL-SCH processor 20810 and an RACH receiver 20812. The call processor 210, the RLC processor 2083, the MAC processor 2082, the RACH receiver 20812, and the DL-SCH/UL-SCH processor 20810 within the layer 1 processor 2081 in the base band signal processor 208 are mutually connected.

In the DL-SCH/UL-SCH processor 20810 in the layer 1 processor 2081, data to be transmitted in downlink undergo channel encoding and IFFT process, and data to be transmitted in uplink undergo channel decoding, FFT process, IDFT process, etc.

The RACH receiver 20812 in the layer 1 processor 2081 detects an uplink random access channel (RACH), or a preamble, which is transmitted by the mobile station 100n. Detection process of the preamble in the RACH receiver 20812 is described below.

The MAC processor 2082 performs downlink data MAC retransmission control, for example, HARQ transmission process, scheduling, and transmission format selection, etc. Moreover, the MAC processor 2082 performs receive processes such as uplink data MAC retransmission control, scheduling, transmission formatting, etc.

The RLC processor 2083 performs, on downlink packet data, RLC layer transmit processes such as a segmentation/concatenation, an RLC retransmission control transmit process, and, on uplink data, RLC layer receive processes such as a segmentation/concatenation, RLC retransmission control receive process, etc. In the RLC processor 2083, the PDCP layer transmit and receive processes as well as the RLC layer transmit and receive processes may be performed.

Figure 10:
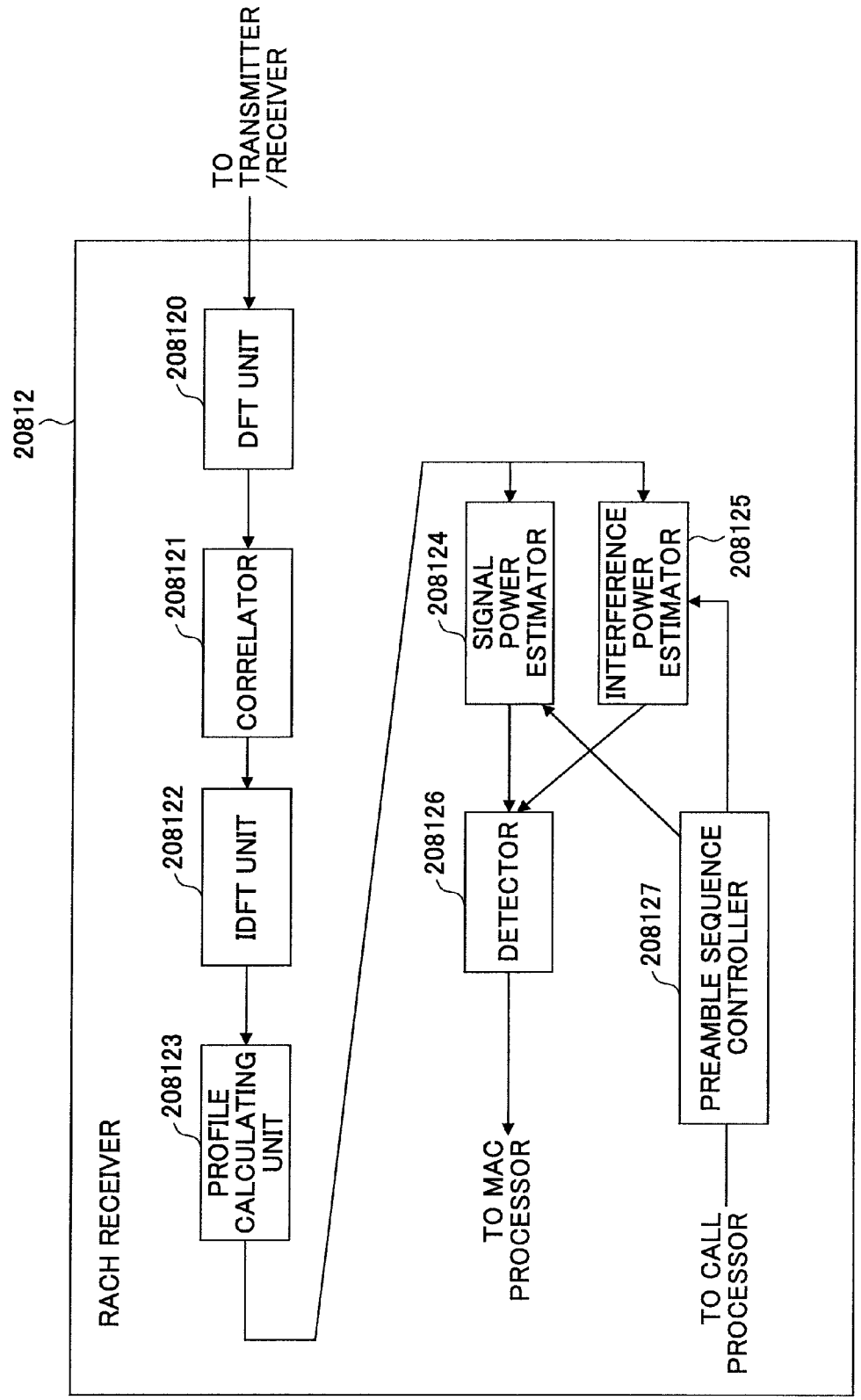
FIG. 10 is a partial block diagram illustrating a RACH receiver of the base station apparatus according to one embodiment of the present invention.

Next, a RACH receiver 20812 is described with reference to FIG. 10.

The RACH receiver 20812 includes a DFT unit 208120, a correlator 208121, an IDFT unit 208122, a profile calculator 208123, a signal power estimator 208124, an interference power estimator 208125, a detector 208126, and a preamble sequence controller 208127.

The DFT unit 208120 performs a DFT (Discrete Fourier Transform) process on a base band signal which has been frequency converted at the transmitter/receiver 206. The FFT process may be performed in lieu of the DFT process.

The correlator 208121 detects a correlation between a received signal converted to a frequency-domain signal by the DFT processing and a Zadoff-Chu sequence, and a correlation value in the frequency domain, in other words, a channel estimated value.

The IDFT unit 208122 performs an inverse discrete Fourier transformation (IDFT) on the channel estimated value and converts the channel estimated value into time domain. The IFFT process may be performed in lieu of the IDFT process.

The profile calculator 208123 outputs, as a delay profile, a result of processing at the IDFT unit 208122. The profile calculator 208123 outputs a delay profile as shown in FIG. 4B, 5B, 7A or 7B, for example.

The preamble sequence controller 208127 determines a preamble sequence used in the random access channel. The preamble sequence controller 208127 may secure some preamble sequences out of multiple preamble sequences used in the random access channel as preamble sequences not to be used in signal transmission. Moreover, the preamble sequence controller 208127 may set preamble sequences, assuming a propagation delay which is greater than a propagation delay calculated from the cell radius.

When securing preamble sequences as preamble sequences not to be used in signal transmission, information on preamble sequences used for the random access channel may be reported as broadcast information or an RRC message to the mobile station from the call processor 210 via the base band signal processor 208, the transmitter/receiver 206, the amplifier 204, and the antenna 202. The preamble sequences for use in the random access channel then correspond to those preamble sequences other than the preamble sequences not to be used in signal transmission.

Alternatively, some of dedicated preamble sequences may be secured as preamble sequences not to be used in signal transmission. In this case, unless the base station apparatus reports, to the mobile station, dedicated preamble sequences secured as preamble sequences not to be used in signal transmission, the dedicated preamble sequences are not transmitted. As a result, dedicated preamble sequences secured as preamble sequences not to be used in the signal transmission may be used to estimate interference power. In this case, the base station apparatus uses dedicated preamble sequences other than those dedicated preamble sequences that are secured as preamble sequences not to be used in the signal transmission when normal dedicated preamble sequences are used (e.g., at the time of a handover). In other words, the base station apparatus reports to the mobile station those dedicated preamble sequences other than dedicated preamble sequences secured as preamble sequences not to be used in the signal transmission.

The interference power estimator 208125 estimates interference power of a random access channel for detecting a preamble sequence. When preamble sequences which are not to be used in signal transmission are secured, the interference power estimator 208125 may use the preamble sequences not to be used in signal transmission to estimate interference power. When the preamble sequence is set, assuming a propagation delay which is greater than the propagation delay calculated from the cell radius, the interference power estimator 208125 may use a period corresponding to a propagation delay which is greater than a propagation delay calculated from the cell radius to estimate the interference power.

The signal power estimator 208124 estimates received power of the preamble sequences. When the preamble sequences which are not to be used in signal transmission are secured, the signal power estimator 208124 may estimate a received power of a preamble sequence which may actually be transmitted. When the preamble sequence is set, assuming a propagation delay which is greater than the propagation delay calculated from the cell radius, the signal power estimator 208124 may estimate received power in a period in which a signal may be received with a propagation delay calculated from the cell radius. More specifically, the signal power estimator 208124 may calculate received power by adding powers of paths that are not less than a predetermined power in the delay profile.

The detector 208126 detects each preamble sequence based on interference power estimated at the interference power estimator 208125 and the received power estimated at the signal power estimator 208124. For example, the detector 208126 may calculate a ratio of peak value of received power and interference power, and determine that a signal has been transmitted when the ratio of the peak of the received power and the interference power exceeds a threshold. Moreover, the detector 208126 may compare interference power and received power averaged within a received window of the preamble sequence that is determined from the cyclic shift interval to determine that the signal has been transmitted when the compared result exceeds a threshold. Moreover, the detector 208124 estimates a signal transmission timing based on the peak of the received signal when it is detected that a signal has been transmitted.

Configuration of Mobile Station

Figure 11:
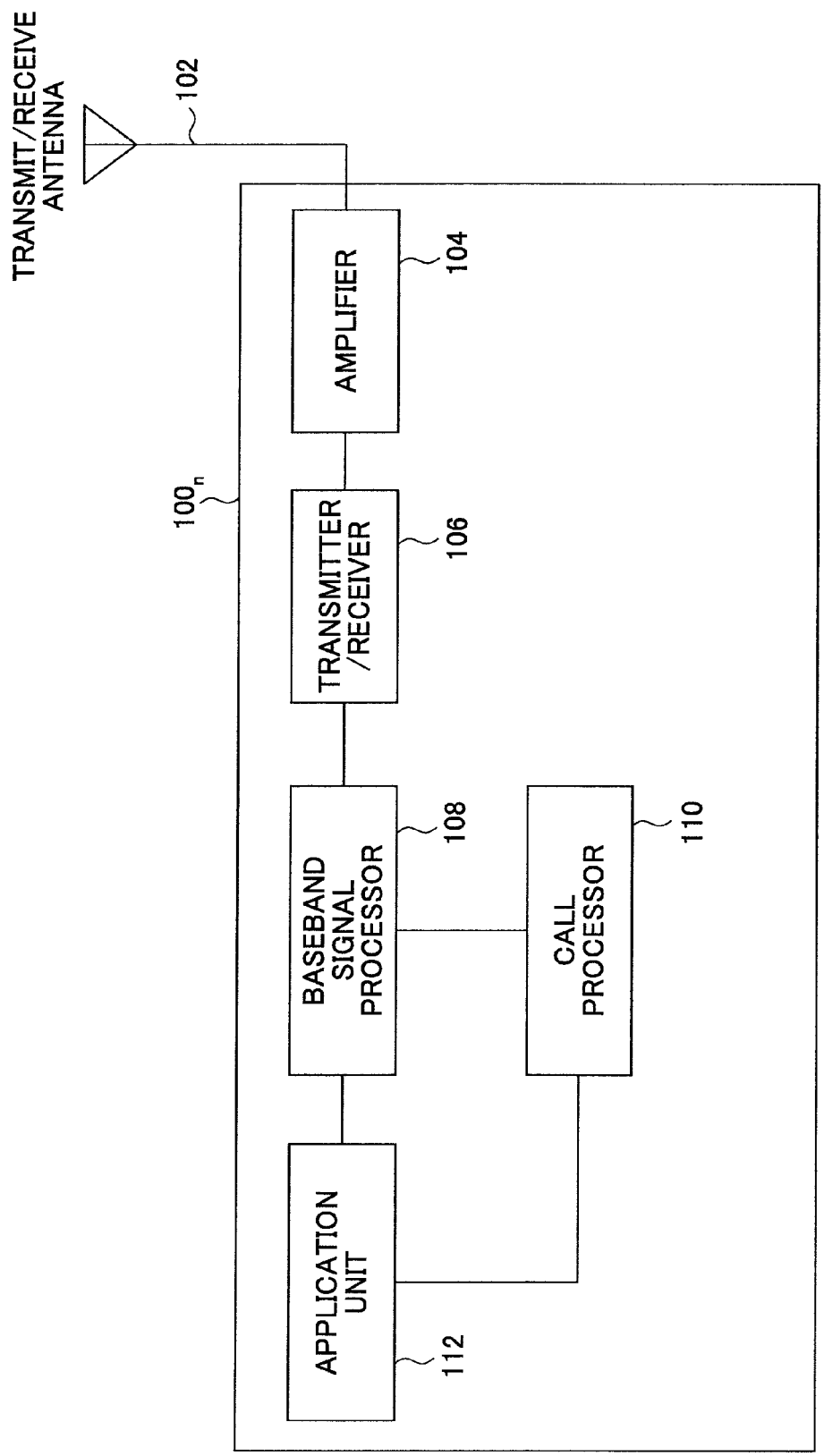
FIG. 11 is a partial block diagram illustrating a mobile station according to one embodiment of the present invention.

Next, a mobile station $100_n$ according to the present embodiment is described with reference to FIG. 11.

As shown, the mobile station $100_n$ includes a transmit/receive antenna 102, an amplifier 104, a transmitter/receiver 106, a base band signal processor 108, a call processor 110, and an application unit 112.

With respect to the downlink data, a radio frequency signal received at the transmit/receive antenna 102 is amplified at the amplifier 104 and frequency converted at the transmitter/receiver 106 to a base band signal. The base band signal as described above undergoes an FFT process, error correcting decoding, and retransmission control receive process at the base band signal processor 108, after which it is transferred to the application unit 112.

On the other hand, the uplink packet data are entered into the base band signal processor 108 from the application unit 112. In the base band signal processor 108, they undergo the retransmission control (H-ARQ (Hybrid ARQ)) transmission process, transmission format selection, channel encoding, DFT process, IFFT process, etc., after which they are transferred to the transmitter/receiver 106. The transmitter/receiver 106 performs a frequency conversion process in which a base band signal output from the base band signal processor 108 is converted to a radio frequency band. Then, the signal is amplified at the amplifier 104, which amplified signal is transmitted from the transmit/receive antenna 102.

Moreover, the mobile station $100_n$ transmits a random access channel in uplink when performing an initial access, uplink synchronization establishment request, handover, scheduling request, etc. For example, the application unit 112 determines to perform the above-described initial access, uplink sync establishment request, handover, or scheduling request, and, based on the determining, the base band signal processor 108 performs a transmission process on the random access channel. Here, the transmission process of the random access channel includes selection of preamble sequences for the random access channel and creation of the sequences, and measurement, etc., of quality information mapped to the random access channel. The random access channel which has undergone a transmission process at the base band signal processor 108 is transmitted to the base station 200 via the transmitter/receiver 106, the amplifier 104, and transmit/receive antenna 102. Moreover, the base band signal processor 108 performs a process of receiving an RRC message and broadcast information included in downlink data.

When information on preamble sequences for use in the random access channel is received via broadcast information or an RRC message, the base band signal processor 108 of the mobile station 100$_n$ performs selection of the preamble sequence and creation process of the sequence based on the above information. Here, when information on those preamble sequences other than preamble sequences not to be used in signal transmission is received as preamble sequences for use in the random access channel, preamble sequences to be transmitted are selected out of preamble sequences other than preamble sequences not used in the signal transmission and a process of creating the same is performed.

The call processor 110 performs control, etc., of communications with the base station 200, and the application unit 112 performs a process on a layer which is upper to a MAC layer and a physical layer.

Communications Control Method in Base Station Apparatus

Figure 12:
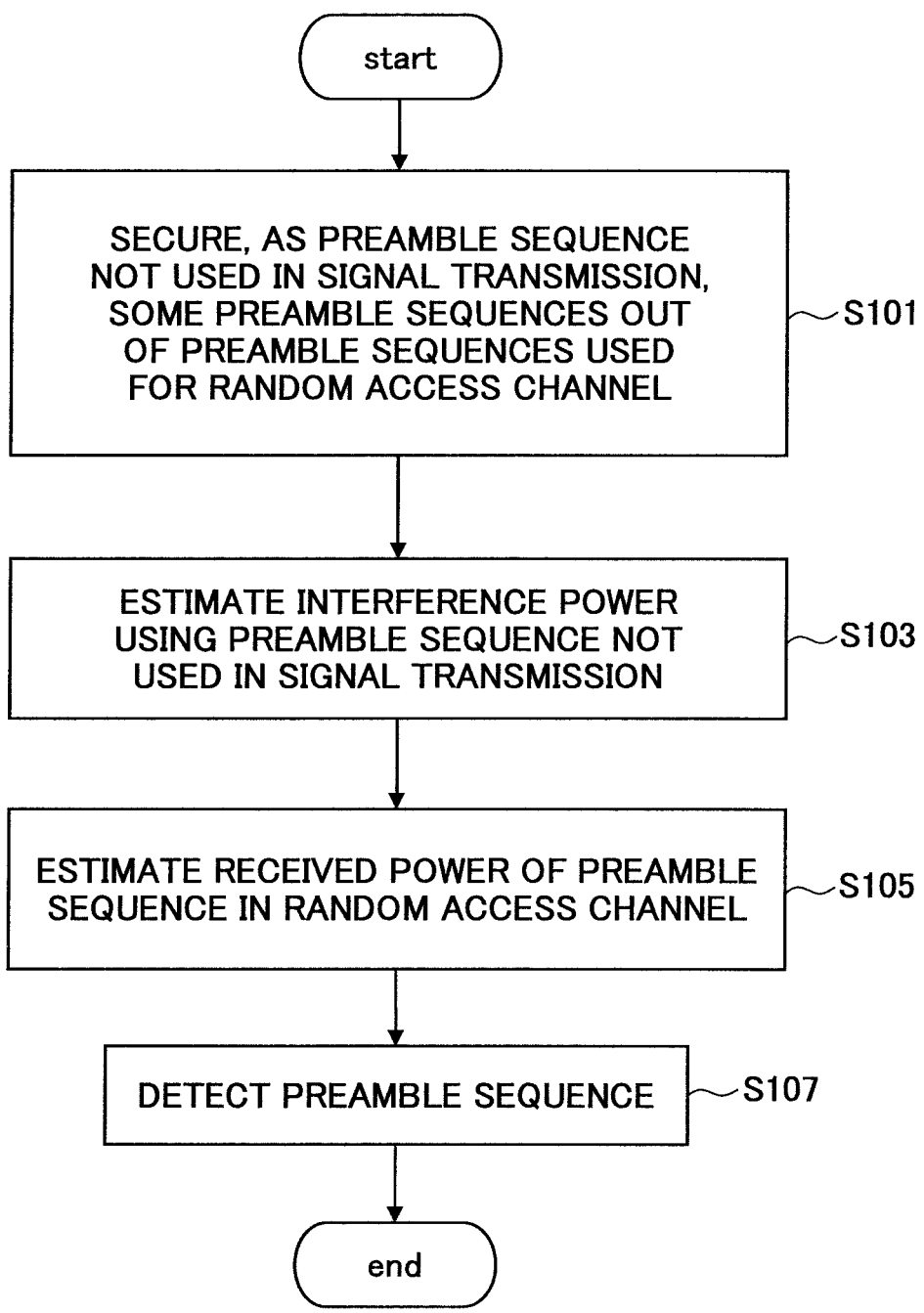
FIG. 12 is a flowchart illustrating a communications control method (part 1) according to one embodiment of the present invention.

Next, a communications control method (part 1) in a base station apparatus 200 according to one embodiment is described with reference to FIG. 12.

First, the base station apparatus 200 secures, as preamble sequences not to be used in signal transmission, some preamble sequences out of preamble sequences used in the random access channel (S101). The base station apparatus 200 may report, to a mobile station, those preamble sequences other than preamble sequences not used in a transmit signal.

The base station apparatus 200 estimates interference power using preamble sequences not to be used in signal transmission when preamble sequences in the random access channel are detected (S103). Moreover, the base station apparatus 200 estimates received power of preamble sequences in the random access channel (S105). The base station apparatus 200 determines a ratio of received power to interference power from estimated received power and estimated interference power and detects preamble sequences (S107).

Figure 13:
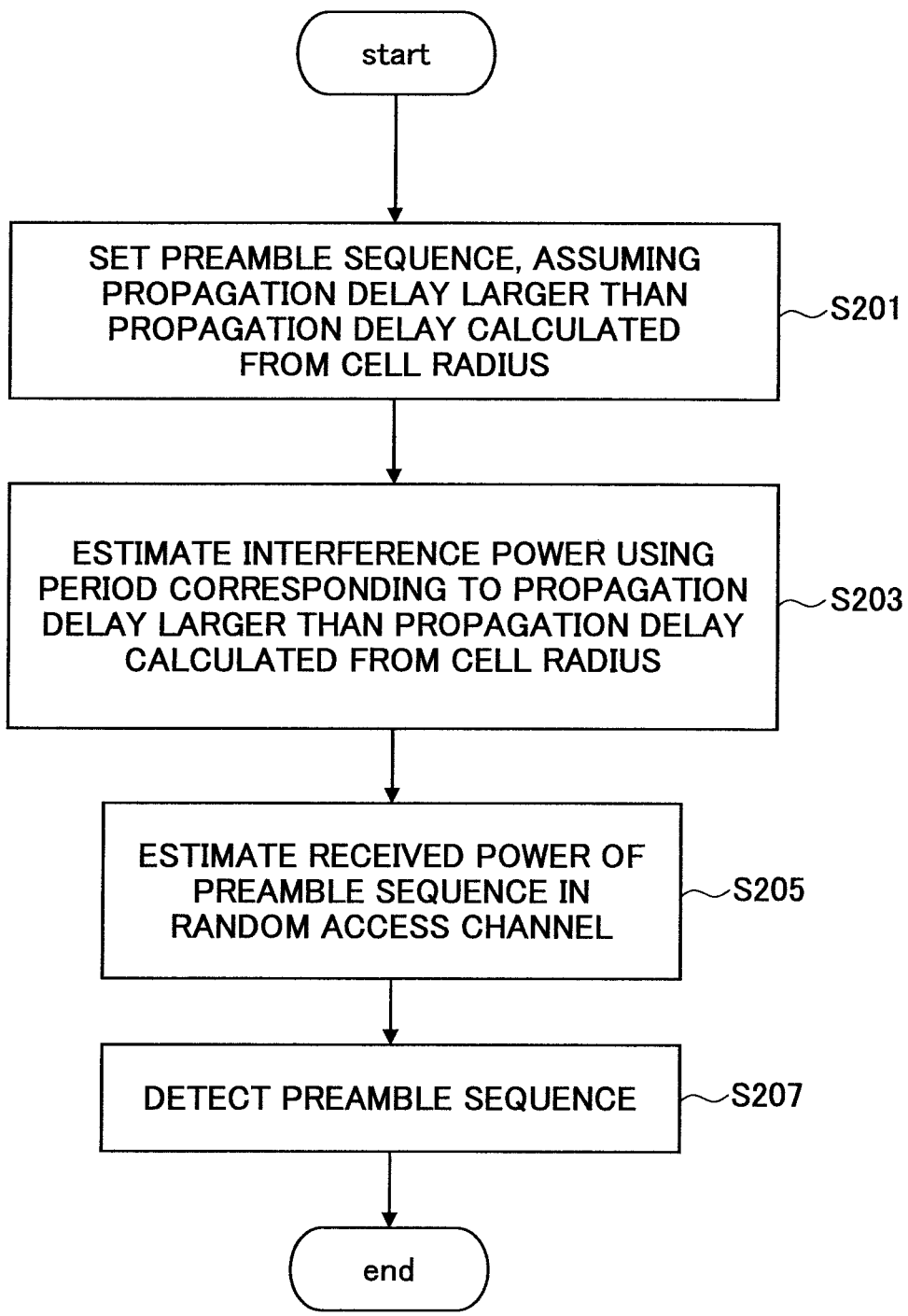
FIG. 13 is a flowchart illustrating the communications control method (part 2) according to one embodiment of the present invention.

Next, a communications control method (part 2) in a base station apparatus 200 according to one embodiment is described with reference to FIG. 13.

Moreover, the base station apparatus 200 sets preamble sequences, assuming a propagation delay which is greater than a propagation delay calculated from the cell radius (S201). When the preamble sequence set in this manner is received, a signal is not actually received in a period corresponding to a propagation delay which is greater than a propagation delay calculated from the cell radius.

The base station apparatus 200 estimates interference power using a period corresponding to a propagation delay which is greater than a propagation delay calculated from the cell radius (S203). Moreover, the base station apparatus 200 estimates received power of preamble sequences in the random access channel (S205). The base station apparatus 200 determines a ratio of received power to interference power from estimated received power and estimated interference power and detects preamble sequences (S207).

While, in the above-described embodiment, an example has been described of a system to which the LTE is applied, the present invention is also applicable to any radio communications system using preamble sequences which are orthogonal in an uplink radio access channel. For example, as the preamble sequences, an example is described of generating them from a Zadoff-Chu sequence which is one of CAZAC sequences, but other orthogonal sequences may be used.

The present application claims priority based on Japanese Patent Application No. 2007-282439, filed on Oct. 30, 2007, the entire contents of which are hereby incorporated by reference.

The invention claimed is:

1. A base station apparatus which communicates in uplink with a mobile station using a random access channel, comprising:
   a preamble-sequence securing unit which secures, as preamble sequences not to be used in signal transmission, some preamble sequences of multiple preamble sequences used in the random access channel; and
   an interference power estimating unit which estimates interference power using the preamble sequences not to be used in the signal transmission,
   wherein the preamble sequence securing unit reports, to the mobile station, information on preamble sequences for use in the random access channel using broadcast information or an radio resource control (RRC) message to secure, as the preamble sequences not to be used in the signal transmission, some preamble sequences out of the multiple preamble sequences used in the random access channel.

2. The base station apparatus as claimed in claim 1, further comprising:
   a received power estimating unit which estimates received power of the preamble sequences in the random access channel; and
   a preamble sequence detecting unit which detects the preamble sequences based on the interference power and the received power.

3. The base station apparatus as claimed in claim 1, wherein the preamble sequence securing unit reports, as preamble sequences for use in contention random access, preamble sequences other than the preamble sequences not to be used in the signal transmission.

4. A base station apparatus which communicates in uplink with a mobile station using a random access channel, comprising:
   a preamble sequence setting unit which sets preamble sequences corresponding to a propagation delay which is greater than a propagation delay calculated from a cell radius; and
   an interference power estimating unit which estimates interference power using a period corresponding to the propagation delay which is greater than the propagation delay calculated from the cell radius.

5. The base station apparatus as claimed in claim 4, further comprising:
   a received power estimating unit which estimates received power of the preamble sequences in the random access channel; and
   a preamble sequence detecting unit which detects the preamble sequences based on the interference power and the received power.

6. A method of controlling communications in a base station apparatus, the communications being in uplink with a mobile station using a random access channel, the method comprising:

a first step of securing, as preamble sequences not to be used in signal transmission, some preamble sequences out of multiple preamble sequences used in the random access channel;

a second step of estimating interference power using the preamble sequences not to be used in the signal transmission;

a third step which estimates received power of the preamble sequences in the random access channel; and a fourth step which detects the preamble sequences based on the interference power and the received power, wherein the first step reports, to the mobile station, information on preamble sequences for use in the random access channel using broadcast information or an RRC message to secure, as the preamble sequences not to be used in the signal transmission, some preamble sequences out of the multiple preamble sequences used in the random access channel.

7. A mobile station which communicates in uplink with a base station apparatus using a random access channel, comprising:

a receive unit which receives, in broadcast information or an radio resource control (RRC) message as preamble sequences for use in the random access channel, information on preamble sequences corresponding to a propagation delay which is greater than a propagation delay calculated from a cell radius; and a transmit unit which transmits a signal in the random access channel using the preamble sequences corresponding to the propagation delay which is greater than the propagation delay calculated from the cell radius.

* * * * *